United States Patent [19]

Kimura et al.

[11] Patent Number: 4,622,162

[45] Date of Patent: Nov. 11, 1986

[54] LIQUID CRYSTAL COMPOSITION

[75] Inventors: Naofumi Kimura; Kenichi Makagawa, both of Tenri; Yutaka Ishii, Nara; Fumiaki Funada, Yamatokoriyama, all of Japan

[73] Assignee: Sharp Kabushiki Kaisha, Osaka, Japan

[21] Appl. No.: 615,475

[22] Filed: May 30, 1984

[30] Foreign Application Priority Data

May 31, 1983 [JP] Japan ............................ 58-98590

[51] Int. Cl.⁴ .......................... C09K 3/34; G02F 1/13
[52] U.S. Cl. ............................ 252/299.5; 252/299.63; 252/299.67; 350/350 R
[58] Field of Search ..................... 252/299.5, 299.63; 350/350 R

[56] References Cited

U.S. PATENT DOCUMENTS

| | | | |
|---|---|---|---|
| 4,198,130 | 4/1980 | Boller et al. | 252/299.5 |
| 4,229,315 | 10/1980 | Krause et al. | 252/299.63 |
| 4,285,829 | 8/1981 | Eidenschink et al. | 252/299.63 |
| 4,330,426 | 5/1982 | Eidenschink et al. | 252/299.63 |
| 4,331,552 | 5/1982 | Eidenschink et al. | 252/299.5 |
| 4,398,803 | 8/1983 | Pohl et al. | 252/299.5 |
| 4,464,283 | 8/1984 | Hasegawa et al. | 252/299.5 |
| 4,469,618 | 9/1984 | Hasegawa et al. | 252/299.5 |
| 4,483,595 | 11/1984 | Irving et al. | 252/299.5 |
| 4,490,305 | 12/1984 | Eidenschink et al. | 252/299.66 |

FOREIGN PATENT DOCUMENTS

| | | | |
|---|---|---|---|
| 57-10672 | 1/1982 | Japan | 252/299.63 |
| 57-21479 | 2/1982 | Japan | 252/299.63 |
| 58-65783 | 4/1983 | Japan | 252/299.63 |
| 58-96674 | 6/1983 | Japan | 252/299.63 |
| 58-204081 | 11/1983 | Japan | 252/299.5 |
| 59-149975 | 8/1984 | Japan | 252/299.5 |
| 2077286 | 12/1981 | United Kingdom | 252/299.66 |

*Primary Examiner*—Teddy S. Gron
*Attorney, Agent, or Firm*—Birch, Stewart, Kolasch & Birch

[57] ABSTRACT

A liquid crystal composition which comprises of at least one compound selected from each of the following groups of compound:

the first group which consists of compounds expressed as the structural formulas,

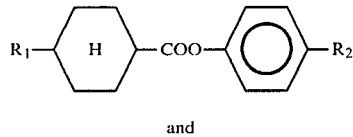

and

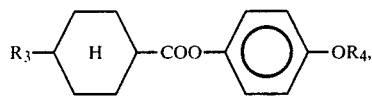

the second group which consists of compounds expressed as the structural formulas,

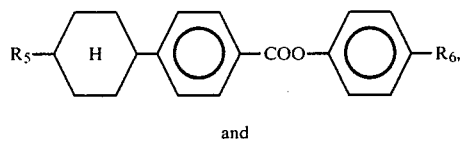

and

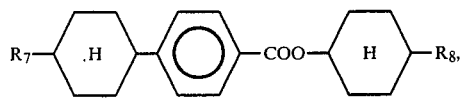

the third group which consists of compounds expressed as the structural formulas, (Abstract continued on next page.)

-continued
and
the fourth group which consists of compounds expressed as the structural formulas,
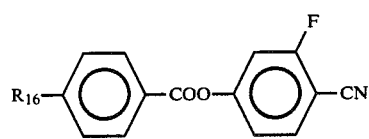
-continued
and
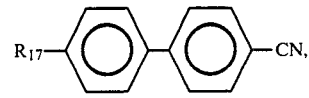
and the fifth group which consists of compounds expressed as the structural formula,
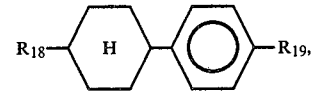
wherein groups $R_1$ to $R_{19}$ are all straight-chain, alkyl groups expressed as $C_nH_{2n+1}$ (n=1~7).
4 Claims, 5 Drawing Figures

LIQUID CRYSTAL COMPOSITION

FIELD OF THE INVENTION

The present invention relates to a liquid crystal composition having a positive dielectric anisotropy Δε and, more particularly, to a liquid crystal composition for use in liquid crystal display devices of the twisted nematic mode which can be driven over a wide range of temperature not only in the static drive scheme but also in the multiplex drive scheme.

DESCRIPTION OF THE PRIOR ART

Display devices which make use of optical effects of liquid crystal have been applied widely in such instruments as electronic calculators and wrist watches, but they can operate only in a narrow range of temperature around room temperature. Recently, liquid crystal display devices come into wide use for devices such as display in an automobile, signal displays, and outdoor measuring instruments, which will be used in an environment where the display devices might be exposed to considerable temperature change. Therefore, a liquid crystal material which has wide mesomorphic range and can be driven in the multiplex drive scheme has been desired strongly. However, prior art liquid crystal materials have not fully satisfied such requirements.

Liquid crystal materials for use in a wide range of temperature should generally satisfy following requirements:

(1) A wide mesomorphic range

Though the mesomorphic range is needed generally to be wide for a liquid crystal materials, it is required to be especially wide for liquid crystal materials for use in an environment where the ambient temperature varies considerably. Physical properties of a liquid crystal vary remarkably near the phase transition temperature thereof. Accordingly, physical properties of liquid crystal materials having a wider mesomorphic range are expected to be rather stable over temperature range for practical use when compared with those of liquid crystal materials having a narrower mesomorphic range.

(2) Weak temperature dependence of the threshold voltage

FIG. 1 shows a typical graph of the transmission of light through liquid crystal material at the viewing angle 0° plotted against the applied voltage. With increase in the applied voltage, the transmission is nearly constant at lower voltages, and then decreases rapidly down to zero above the threshold voltage. Here, the threshold voltage is defined as $V_{90\%}^\theta$ where the transmission at temperature $\theta$ becomes 90%. A parameter $\gamma$ which characterizes the temperature dependence of the threshold voltage is defined as follows:

$$\gamma = (V_{90\%}^{-10°\,C.} - V_{90\%}^{60°\,C.})/(V_{90\%}^{25°\,C.} \cdot 70),$$

wherein $V_{90\%}^{-10°\,C.}$, $V_{90\%}^{60°\,C.}$, and $V_{90\%}^{25°\,C.}$ are the threshold voltage at temperature $-10°$ C., $60°$ C. and $25°$ C., respectively. In other words, this parameter shows an average of the temperature coefficient of the threshold voltage $V_{90\%}$ per 1° C. in the temperature range between $-10°$ C. and $60°$ C.

In liquid crystal display devices of the twisted nematic mode, the transmission of light changes precipitously near the threshold voltage. Then, a change in temperature causes a change in the threshold voltage to affect remarkably characteristics of a liquid crystal display such as the contrast characteristics. In order to improve the contrast characteristics in liquid crystal display devices for use in wide temperature range, it is necessary, for example, to adapt the driving voltage to a change in temperature. Therefore, the temperature dependence of the threshold voltage should be as weak as possible. If the temperature dependence of the threshold characteristics becomes weak, the contrast characteristics will be improved very effectively, especially in liquid crystal displays in the multiplex drive scheme.

(3) Rapid response, especially at low temperatures

The response characteristics of liquid crystal display devices are generally proportional to the viscosity of liquid crystal material. Therefore, the viscosity of liquid crystal material should be low in order to improve the response characteristics.

The temperature dependence of the viscosity $\eta$ is expressed as follows:

$$\eta = \eta_0 \exp(\Delta E/kT),$$

wherein T is the absolute temperature, k Boltzmann's constant, $\Delta E$ the activation energy, and $\eta_0$ a constant which depends on the liquid crystal material. As is apparent in the expression, $\eta$ increases exponentially with decreasing temperature. The magnitude of the increase in $\eta$ depends also on the activation energy $\Delta E$. Accordingly, liquid crystal materials should have small $\eta$ and $\Delta E$ in order to realize the rapid response at low temperatures.

SUMMARY OF THE INVENTION

The object of the present invention is to provide a liquid crystal composition which mesomophic range is wide, which temperature dependence of the threshold voltage is weak, and which response characteristics is good.

A liquid crystal composition according to the present invention comprises at least one compound selected from each of the following compound groups (I) to (IV):

Compound group (I).

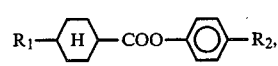   [Component (1)]

and

   [Component (2)]

Compound group (II).

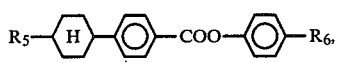   [Component (3)]

and

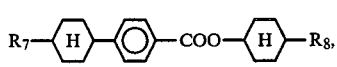   [Component (4)]

Compound group (III).

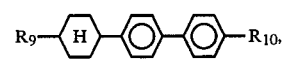   [Component (5)]

-continued

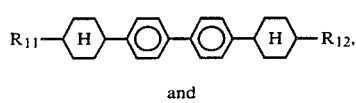

and

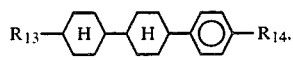

Compound group (IV),

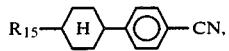

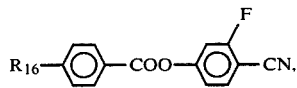

and

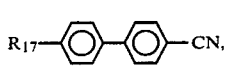

and

Compound group (V),

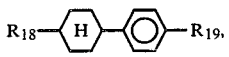

[Component (6)]

[Component (7)]

[Component (8)]

[Component (9)]

[Component (10)]

[Component (11)]

wherein alkyl groups $R_1$ to $R_{19}$ are all straight-chain, and can be expressed as $R=C_nH_{2n+1}$ ($n=1$ to 7).

An advantage of the present invention is to provide new liquid crystal compositions which mesomorphic range is very wide to be over 120° C.

Liquid crystal display devices of the twisted nematic mode to which a liquid crystal composition according to the present invention is applied show good contrast characteristics over a wide temperature range because the temperature dependence of the threshold voltage is low, and the response characteristics are superior, especially at low temperatures. The abovementioned liquid crystal display devices can be operated not only by the static drive but also by the multiplex drive. They are distinctly superior to prior art liquid crystal display devices especially in the multiplex drive.

The liquid crystal composition according to the present invention can be applied not only to a liquid crystal display of the twisted nematic mode but also to those such as of the guest-host mode and of the phase-transition mode.

Use of the liquid crystal composition of the present invention provides a very reliable display for a number of appliances used in an environment where the ambient temperature around a display changes considerably, for example, for hand-held electronic calculators, wrist watches, outdoor measuring instruments, displays provided on a dashboard of an automobile, and televisions.

Other objects and advantages of the present invention will become apparent from the detailed description of the present invention and the appended claim with reference to the accompanying drawings:

FIG. 1 is a graph of the transmission of the light plotted against the voltage applied to the liquid crystal, and shows the definition of the threshold voltage $V_{90\%}$, FIG. 2 is a graph which shows $T_{NI}$ and $\eta_{20}$ of liquid crystal materials, FIG. 3 is a graph which shows the definition of the decay time $\tau_d$, FIG. 4 is a graph which shows the temperature dependence of $\tau_d$ of mixed liquid crystals with 20 wt % of $N_p$ material A, B, C, D, E or F, and FIG. 5 is a graph of $\gamma$ of the mixed liquid crystals with 20 wt % $N_p$ material A, B, C, D, E or F plotted against the $N_p$ concentration.

DETAILED DESCRIPTION OF THE INVENTION

Figure 1:
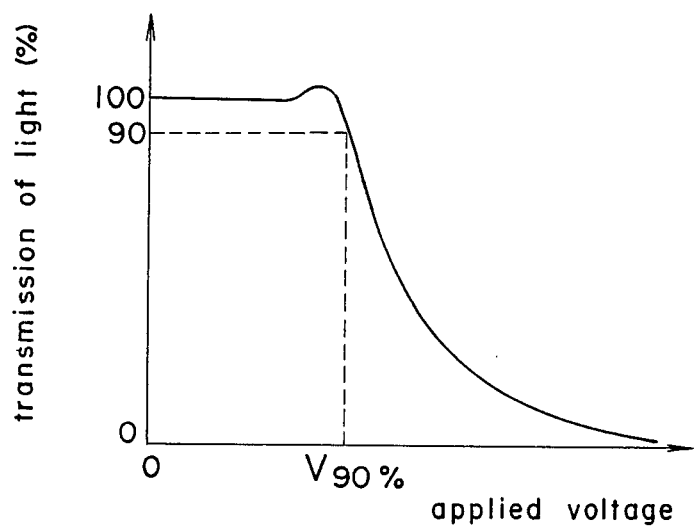

A liquid crystal composition according to the present invention comprises components selected from each of the abovementioned five compound groups. A compound which belongs to the first and second group is a material which improves the temperature dependence of the threshold voltage of a liquid crystal composition. A compound which belongs to the third group is a high clearing point material. A compound which belongs to the fourth group is a material ($N_p$ material) to adjust the threshold voltage and has the positive dielectric anisotropy $\Delta\epsilon$, where $\Delta\epsilon=\epsilon_{11}-\epsilon_1$, and $\epsilon_{11}$ and $\epsilon_1$ are the dielectric constant in the direction parallel and perpendicular to a liquid crystal molecule, respectively. A compound which belongs to the fifth group is a material to lower the viscosity. In the following, we explain the process and technological data to choose the abovementioned components.

In order to provide liquid crystal materials for use in wide temperature range, it is most important to lower the temperature dependence of the threshold voltage of a liquid crystal composition. We first examine a variety of compounds in detail, and found that ester compounds expressed in the general formula,

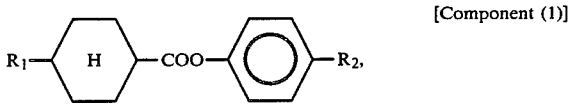

[Component (1)]

and

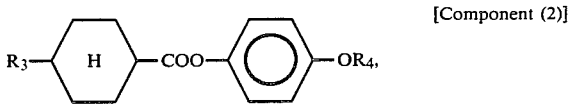

[Component (2)]

are very effective in order to improve the temperature characteristics of mixed liquid crystals.

Typical comparison is the two liquid crystal compositions, Comp. I and Comp. II, whose components are shown in Table 1, comprising similar components to each other. Both contain mainly cyclohexane compounds, but Comp. II contains 10 wt % of compounds which belong to Component 2. The $\gamma$ value of Comp. II, 0.25%/°C., is much better than that of Comp. I, 0.41%/°C. In other words, the addition of compounds which belong to Component (2) improves remarkably the temperature dependence of the threshold characteristics of a liquid crystal composition.

TABLE 1

| component | Comp. I | Comp. II |
|---|---|---|
| $C_3H_7$—H—◯—CN | 15 wt % | 15 wt % |
| $C_5H_{11}$—H—◯—CN | 6 | — |

TABLE 1-continued

| component | Comp. I | Comp. II |
|---|---|---|
| $C_3H_7$—H—O—$C_2H_5$ | 20 | 18 |
| $C_3H_7$—H—O—$OC_2H_5$ | 10 | 11 |
| $C_5H_{11}$—H—O—O—CN | 7 | 2 |
| $C_3H_7$—H—O—O—$C_2H_5$ | 10 | 10 |
| $C_5H_{11}$—H—O—O—$C_2H_5$ | 9 | 9 |
| $C_3H_7$—H—O—O—H—$C_3H_7$ | 3 | 4 |
| $C_5H_{11}$—H—O—O—H—$C_3H_7$ | 6 | 7 |
| $C_3H_7$—H—COO—O—$OC_2H_5$ | — | 5 |
| $C_4H_9$—H—COO—O—$OC_2H_5$ | — | 5 |
| $C_3H_7$—H—O—COO—O—$C_3H_7$ | 8 | 8 |
| $C_5H_{11}$—H—O—COO—O—$C_3H_7$ | 6 | 6 |

A similar improvement was also observed in a liquid crystal composition, not listed in Table 1, wherein compounds which belong to Component (1) were mixed instead of those which belong to Component (2). Similar tendency as for the γ value was also observed in liquid crystal compositions wherein main components are other than phenylcyclohexane liquid crystals. As is apparent from the abovementioned data, a compound which belong to Componenet (1) or (2) is very effective to improve the temperature dependence of the threshold voltage in the mixed liquid crystal.

However, the nematic-isotropic phase transition temperature $T_{NI}$ of those ester compounds which belong to Component (1) or (2) is as low as 40°~80° C. so that the addition of an amount of those compounds enough to improve the temperature dependence of the threshold characteristics lowers $T_{NI}$ of a liquid crystal mixture or composition considerably.

Then, we searched compounds which can increase $T_{NI}$ without obstructing the exhibition of the abovementioned characteristics of the ester compounds. We found experimentally that compounds which are expressed by the following general formulas are good:

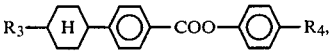

[Component (3)]

and

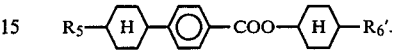

[Component (4)]

$T_{NI}$'s of compounds which belong to Component (3) or (4) range from 150° C. to 200° C. Accordingly, the addition of compounds which belong to Component (3) or (4) raises $T_{NI}$ readily. Furthermore, the mixing of those compounds with compounds which belong to Component (1) or (2) does not hinder the appearance of the abovementioned characteristics of the latters. The total amount of the ester compounds which belong to Component (1) to (4) should be from about 10 wt % to 30 wt % for the addition of those compounds to become effective, and is preferably about 20 wt %. Its upper limit is about 30 wt % above which the threshold voltage and viscosity of a liquid crystal composition become too high.

The ester compounds worsen the response characteristics though they have the abovementioned advantage. Then, we tested a variety of low viscosity materials in order to improve the response characteristics. It is found that compounds which are expressed with the structural formula

[Component (11)]

make the viscosity remarkably low so that they are suitable as a material to lower the viscosity of a mixed material.

Table 2 shows $T_{NI}$ and $\eta_{20}$ of representative low viscosity materials, where $\eta_{20}$ is the viscosity at 20° C. As is apparent in Table 2, the viscosity is the lowest in 4-(trans-4-n-propylcyclohexyl)-ethylbenzene. Furthermore, it was confirmed experimentally that this compound suppresses the appearance of the smectic phase effectively.

TABLE 2

| general formula | structural formula | $T_{NI}$ (°C.) | $\eta_{20}$ (cP) |
|---|---|---|---|
| R—H—O—R′ | $C_3H_7$—H—O—$C_2H_5$ | −70 | 4 |
| R—H—O—OR′ | $C_3H_7$—H—O—$OC_2H_5$ | 37 | 7 |

TABLE 2-continued

| general formula | structural formula | $T_{NI}$ (°C.) | $\eta_{20}$ (cP) |
|---|---|---|---|
| ROR'–[H]–[H]–R' | C₃H₇–[H]–◯–OC₄H₉ | 32 | 10 |
|  | CH₃OCH₂–[H]–[H]–C₃H₇ | 52 | 7 |

Accordingly, compounds which belong to Component (11) are chosen as low viscosity materials which improve the response characteristics and lower the smectic-nematic phase transition temperature $T_{SN}$ so largely that the liquid crystal composition remains in the nematic phase down to very low temperatures. The addition of a low viscosity material of Component (11) to a mixture of ester compounds of the abovementioned type does not affect the temperature dependence of the threshold voltage, whereas it lowers $T_{SN}$ and improves the response characteristics. The amount of the low viscosity materials should be more than about 10 wt % for the addition of those compounds to become effective, but is preferably about 20 wt % where the $T_{NI}$ is moderate for a practical use. It should not be too high to lower $T_{NI}$ excessively.

Figure 2:
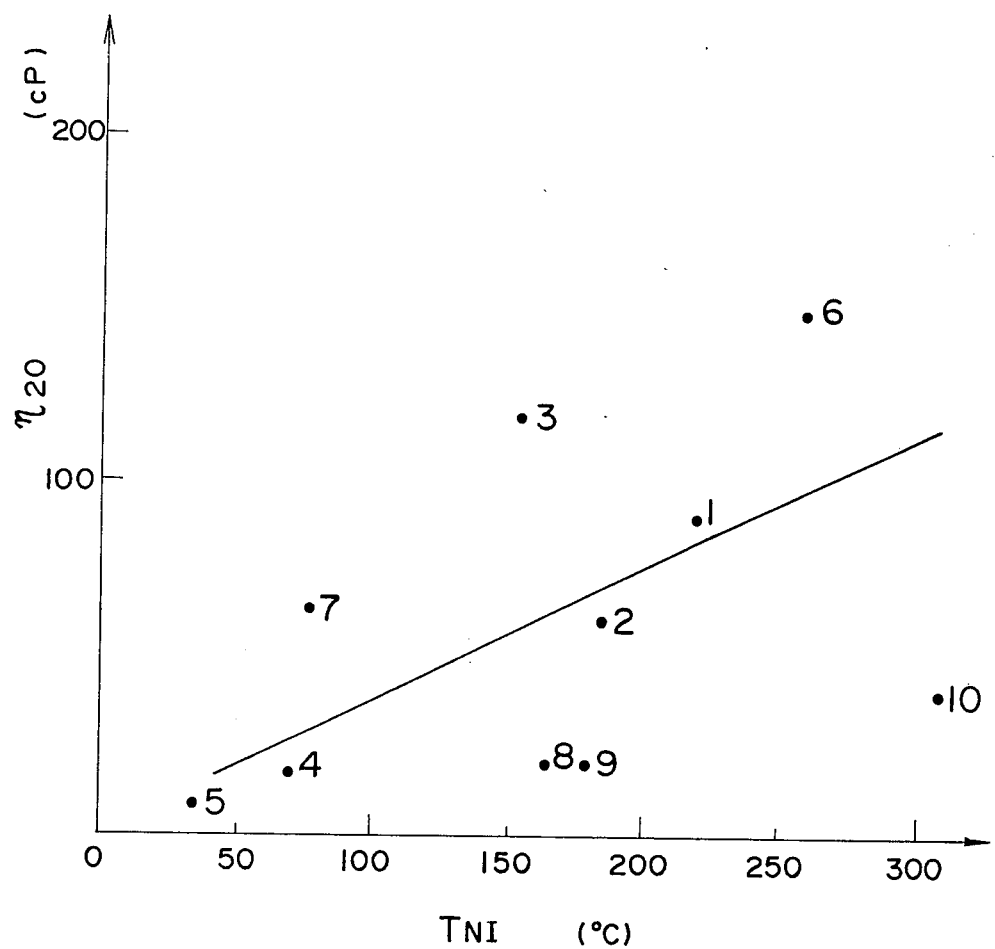

Next, we explain the high clearing point material. The abovementioned addition of compounds of Component (11) lowers the viscosity of a resultant mixed material remarkably. Unfortunately, it lowers $T_{NI}$ of a resultant mixed material largely since $T_{NI}$'s of compounds of Component (11) are as low as about −70° C. as shown in Table 2. Therefore, it is necessary to mix a high clearing point material together with low viscosity materials, in order to raise the clearing point. A high clearing point material shows a tendency that the viscosity is large because it consists of long molecules. Then, we examined $T_{NI}$ and $\eta_{20}$ of a variety of liquid crystal materials in order to choose a high $T_{NI}$ material having relatively low viscosity. Table 3 shows a list of examples of materials examined, and FIG. 2 shows a graph of $\eta_{20}$ and $T_{NI}$ of the materials.

TABLE 3

List of high clearing point materials

| NO. | structural formula |
|---|---|
| 1 | C₅H₁₁–[H]–◯–◯–CN |
| 2 | C₃H₇–[H]–◯–COO–◯–C₃H₇ |
| 3 | C₅H₁₁–[H]–◯–COO–[H]–C₃H₇ |
| 4 | C₅H₁₁–[H]–COO–◯–OCH₃ |
| 5 | C₃H₇–[H]–◯–OC₂H₅ |
| 6 | C₅H₁₁–◯–◯–◯–CN |

TABLE 3-continued

List of high clearing point materials

| NO. | structural formula |
|---|---|
| 7 | C₃H₇–[H]–[H]–CN |
| 8 | C₅H₁₁–[H]–◯–◯–C₂H₅ |
| 9 | C₃H₇–[H]–[H]–◯–CH₃ |
| 10 | C₅H₁₁–[H]–◯–◯–[H]–C₃H₇ |

As is apparent from FIG. 2, the following compounds are suitable among a variety of materials ($T_{NI} > 100°$ C.) as high clearing point materials to be mixed in a liquid crystal composition for use in a wide range of temperature: 4-(trans-4-pentylcyclohexyl)-4'-ethylbiphenyl, 4-(4-propylcyclohexyl)-4'-methylphenylcyclohexane, and 4-(trans-4-n-pentylcyclohexyl)-4'-trans-4-n-propylcyclohexylbiphenyl. They have high $T_{NI}$ and the low viscosity. It was also found that the temperature dependence of the viscosity is very small when compared with materials having polar groups such as an ester group inside the molecule or with materials having a polar group such as a cyano group at an end of the molecule. A similar tendency was also observed when compared with materials having an alkyl group or an alkoxy group not listed in Table 3. Accordingly, we choose as high clearing point materials following compounds:

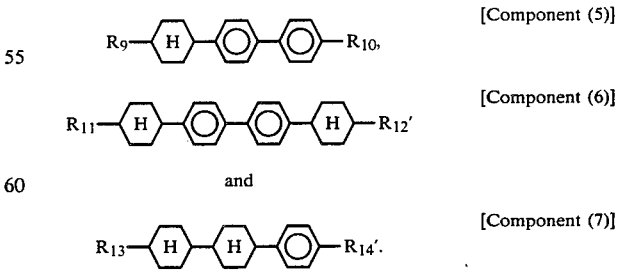

[Component (5)]

R₉–[H]–◯–◯–R₁₀,

[Component (6)]

R₁₁–[H]–◯–◯–[H]–R₁₂' and

[Component (7)]

R₁₃–[H]–[H]–◯–R₁₄'.

The total amount of those compounds in a liquid crystal composition should be more than about 20 wt % for the addition of those compounds to become effective, and preferably about 25 wt %. It should not be higher than about 35 wt % above which $T_{CN}$ becomes excessively high.

Finally, we examined a variety of $N_p$ material having $\Delta\epsilon>>0$ in order to make $\Delta\epsilon$ of a liquid crystal composition positive. We have measured the temperature dependence of the threshold voltage $V_{90\%}$ and the decay time $\tau_d$ of mixed liquid crystals of Liquid crystal composition III having components shown in Table 4 each with 20 wt % of one of $N_p$ materials A to F listed in Table 5. The two quantities were measured in a liquid crystal cell of the twisted nematic mode of thickness 10 μm along the direction normal to the cell.

Figure 3:
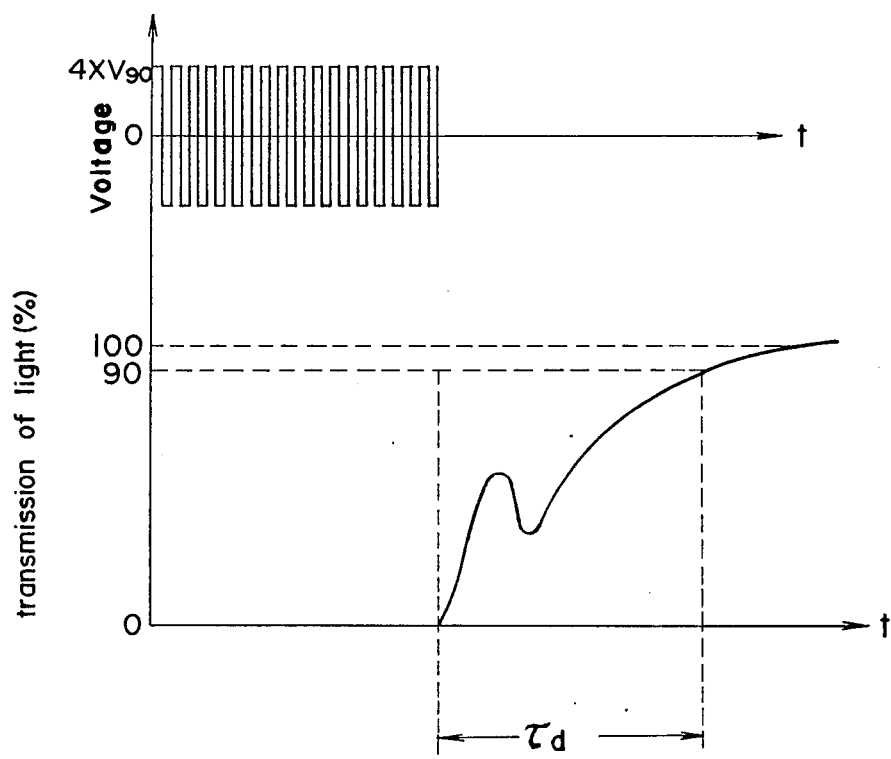

The decay time $\tau_d$ is defined as shown in FIG. 3. The transmission of light begins to increase from zero after the AC square wave voltage of the magnitude $4\times V_{90\%}$ vanishes. $\tau_d$ is defined as the time interval between which the transmission of light recovers up to 90%.

Figure 4:
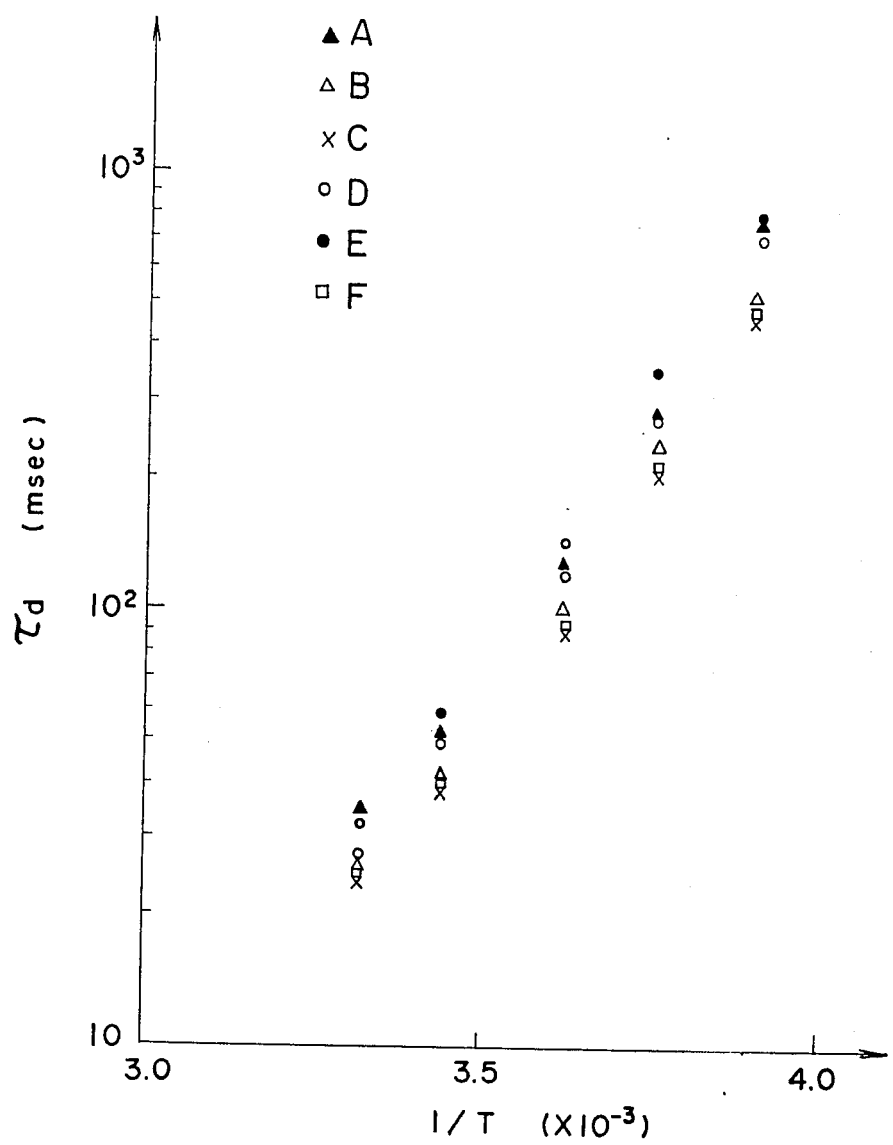
Figure 5:
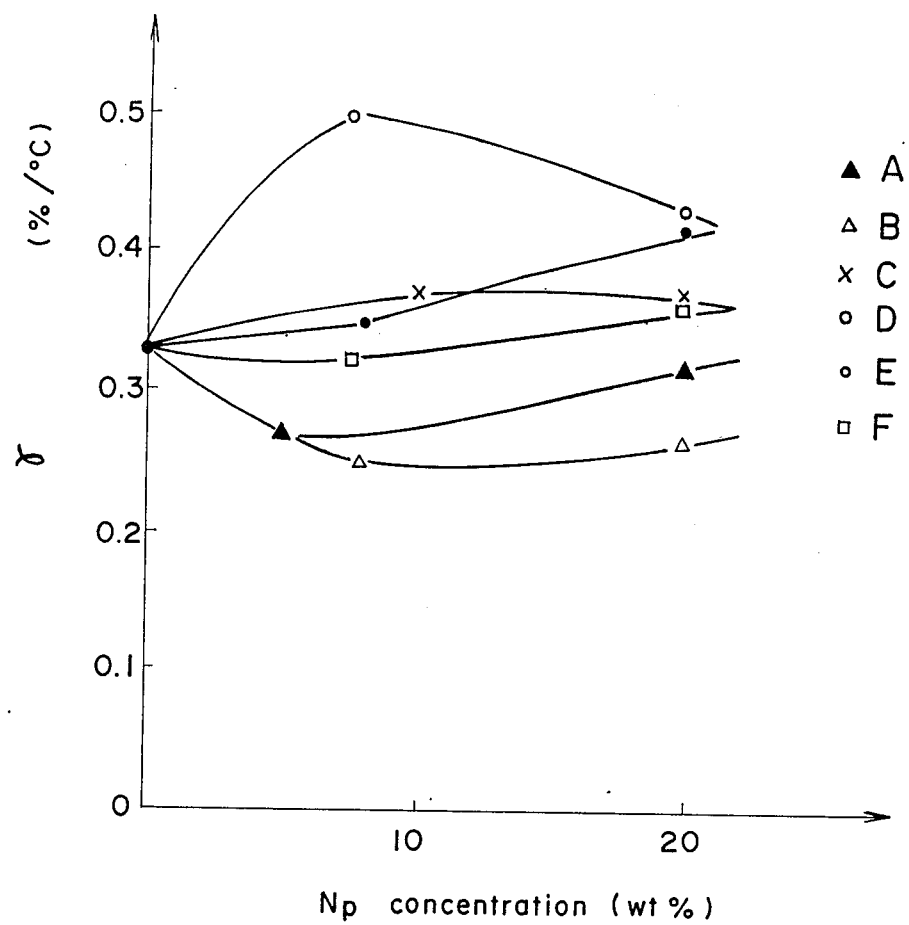

FIG. 4 shows the temperature dependence of $\tau_d$ of the abovementioned mixed liquid crystals. As is apparent from FIG. 4, a phenylcyclohexane compound (C) and a biphenyl compound (F) are superior among the $N_p$ materials as a component of a liquid crystal composition for use in wide temperature range because of their relatively fast response. FIG. 5 shows the temperature dependence of the threshold voltage of the mixed liquid crystals. It is apparent that the variation of the threshold voltage of the liquid crystal compositions mixed with 20 wt % of one of the abovementioned materials A to F becomes smaller in the order of $D>C>E>F>A>B$. Therefore, we choose the following compounds as $N_p$ materials based upon those data:

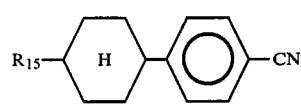

[Component (8)]

and

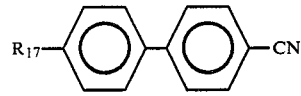

[Component (10)]

and the following compounds based upon the temperature dependence of the threshold voltage $V_{90\%}$

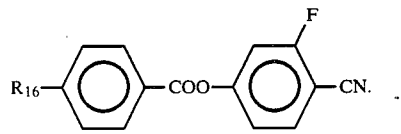

[Component (9)]

An $N_p$ material should be selected among the abovementioned three kinds of compounds according to the application of a liquid crystal composition. The total amount of those compounds should be more than about 15 wt % for the addition of those compounds to become effective, but should not exceed about 30 wt % above which concentration may result in low $T_{NI}$ and high viscosity.

Based upon the abovementioned grounds, a superior liquid crystal composition can be prepared by mixing the abovementioned components. In the following, examples will be illustrated according to the present invention.

TABLE 4

| liquid crystal composition III | |
|---|---|
| component | concentration |
| $C_3H_7$—(H)—(⌬)—CN | 15 wt % |
| $C_3H_7$—(H)—(⌬)—$C_2H_5$ | 27 |
| $C_3H_7$—(H)—(⌬)—$OC_2H_5$ | 10 |
| $C_5H_{11}$—(H)—(⌬)—(⌬)—CN | 7 |
| $C_3H_7$—(H)—(⌬)—(⌬)—$C_2H_5$ | 9 |
| $C_5H_{11}$—(H)—(⌬)—(⌬)—$C_2H_5$ | 8 |
| $C_5H_{11}$—(H)—(⌬)—(⌬)—(H)—$C_3H_7$ | 10 |
| $C_3H_7$—(H)—(⌬)—COO—(⌬)—$C_3H_7$ | 8 |
| $C_5H_{11}$—(H)—(⌬)—COO—(H)—$C_3H_7$ | 6 |

TABLE 5

| | List of $N_p$ materials |
|---|---|
| | structural formula |
| A | $C_3H_7$—(⌬)—COO—(⌬-Cl)—CN |
| B | $C_3H_7$—(⌬)—COO—(⌬-F)—CN |
| C | $C_3H_7$—(H)—(⌬)—CN |
| D | $C_5H_{11}$—(dioxane)—(⌬)—CN |
| | $C_4H_9$—(dioxane)—(⌬)—CN |
| E | $C_3H_7OC_2H_5$—(⌬)—COO—(⌬)—CN |

TABLE 5-continued

List of $N_p$ materials structural formula

C4H9OC2H5—⟨phenyl⟩—COO—⟨phenyl⟩—CN

F

C3H7—⟨phenyl⟩—⟨phenyl⟩—CN

C5H11—⟨phenyl⟩—⟨phenyl⟩—CN

EXAMPLES

The respective compositions of Liquid crystal compositions A, B, C and D according to the present invention are shown in Table 6. They are prepared by mixing and heating the components of the ratio shown in Table 6 for a resultant mixture to become transparent under ambient pressure.

Liquid crystal composition A becomes the nematic phase between −40° C. and 87° C. Liquid crystal composition A was filled in a twisted nematic mode cell of thickness about 10 μm. The rubbing process for the twisted nematic mode was applied to the substrates of the cell. Polarisers were fixed on the both sides of the cell in order for the light axis to become perpendicular to each other. An AC voltage of frequency about 1 kHz was applied to the liquid crystal layer, and the display characteristics were measured.

Table 7 shows the characteristics of Liquid crystal composition A as well as those of a representative prior art liquid crystal Nr2702 of F. Hoffman-La Rosche for use in wide temperature range for comparison. $\alpha^{25°\ C.}$ is defined as $V_{10\%}^{25°\ C.}/V_{90\%}^{25°\ C.}$.

Liquid crystal composition A apparently has such superior characteristics when compared with the prior art liquid crystal composition as follows:

(1) The threshold voltage is low.

(2) The temperature dependence of the threshold voltage is remarkably weak.

(3) The response is fast even at low temperatures.

Liquid crystal composition B becomes the nematic phase between −40° C. and 82° C. The characteristics of Liquid crystal composition B measured similarly are also shown in Table 7. Table 7 indicates clearly that it has very superior characteristics such as the temperature dependence of the threshold voltage and the response characteristics, and can be driven at low applied voltage when compared with the prior art liquid crystal composition.

TABLE 6

| component | Liquid crystal composition | | | |
|---|---|---|---|---|
| | A (wt %) | B (wt %) | C (wt %) | D (wt %) |
| C5H11—⟨cyclohexyl⟩—⟨phenyl⟩—⟨phenyl⟩—C2H5 | 12.6 | 11.7 | 12.6 | 12.6 |
| C5H11—⟨cyclohexyl⟩—⟨phenyl⟩—⟨phenyl⟩—⟨cyclohexyl⟩—C3H7 | 8.9 | 8.3 | 8.9 | 8.9 |
| C3H7—⟨cyclohexyl⟩—⟨cyclohexyl⟩—⟨phenyl⟩—CH3 | 6.3 | 5.9 | 6.3 | 6.3 |
| C3H7—⟨cyclohexyl⟩—⟨cyclohexyl⟩—⟨phenyl⟩—C2H5 | 6.3 | 5.9 | 6.3 | 6.3 |
| C3H7—⟨cyclohexyl⟩—⟨phenyl⟩—C2H5 | 21.7 | 20.2 | 21.7 | 21.7 |
| C5H11—⟨cyclohexyl⟩—COO—⟨phenyl⟩—C5H11 | 6.8 | 6.3 | 6.8 | 6.8 |
| C3H7—⟨cyclohexyl⟩—COO—⟨phenyl⟩—OC2H5 | 6.8 | 6.3 | 6.8 | 6.8 |

TABLE 6-continued

| component | Liquid crystal composition | | | |
|---|---|---|---|---|
| | A (wt %) | B (wt %) | C (wt %) | D (wt %) |
| 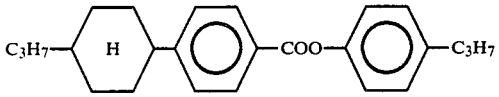 | 6.8 | 6.3 | 6.8 | 6.8 |
| 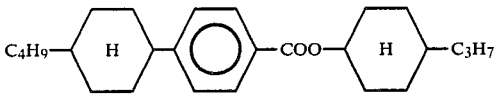 | 6.8 | 6.3 | 6.8 | 6.8 |
| 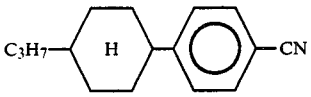 | 6.2 | 5.8 | — | 5.8 |
| 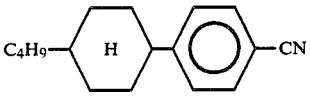 | 6.2 | 5.8 | — | 5.8 |
| 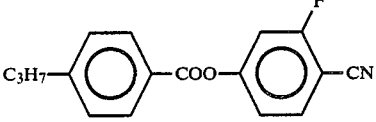 | 4.6 | 4.3 | 4.6 | — |
|  | — | 3.8 | 6.2 | 6.0 |
|  | — | 3.3 | 6.2 | 5.5 |

Though not shown explicitly, both Liquid crystal compositions C and D are also superior on the wide temperature characteristics.

The invention may be embodied in other specific forms without departing from the spirit or essential characteristics thereof. The foregoing examples are therefore to be considered in all aspects as illustrative and not restrictive, the scope of the invention being indicated by the appended claims rather than by the foregoing description and all changes which come within the meaning and range of equivalency of the claims are therefore intended to be embraced therein.

TABLE 7

| characteristics | Liquid crystal composition | | |
|---|---|---|---|
| | A | B | Prior Art |
| $V_{90\%}^{25°C.}$ | 2.46 $V_{rms}$ | 2.2 $V_{rms}$ | 2.7 $V_{rms}$ |
| $V_{10\%}^{25°C.}$ | 3.4 $V_{rms}$ | 3.0 $V_{rms}$ | 3.7 $V_{rms}$ |
| α 25° C. | 1.38 | 1.38 | 1.38 |
| $dV_{90\%}/dT$(60 10° C.) | 6.1 mV/°C. | 5.7 mV/°C. | 12.9 mV/°C. |
| γ (60 10° C.) | 0.25%/°C. | 0.26%/°C. | 0.49%/°C. |
| τα (T = −10° C.) | 420 ms | 450 ms | 500 ms |
| τα (T = 25° C.) | 58 ms | 60 ms | 58 ms |
| $T_{NI}$ | 87° C. | 82° C. | 91.2° C. |
| $T_{CN}$ | <−40° C. | <−40° C. | <−30° C. |

What is claimed as new:

1. A liquid crystal composition which comprises of at least one compound selected from each of the following groups of compound:

the first group which consists of compounds expressed as the structural formulas,

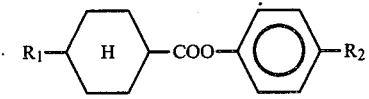

and

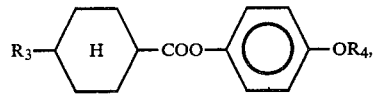

the second group which consists of compounds expressed as the structural formulas,

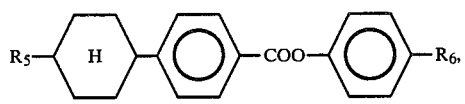

and

-continued

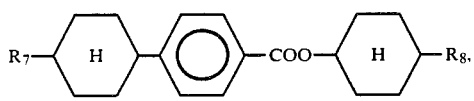

the third group which consists of compounds expressed as the structural formulas,

and

the fourth group which consists of compounds expressed as the structural formulas,

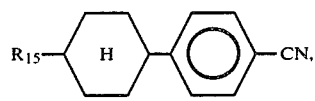

-continued

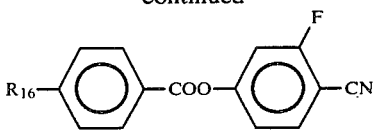

and

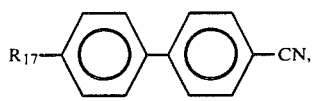

and the fifth group which consists of compounds expressed as the structural formula,

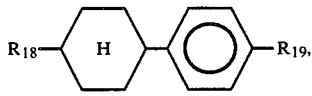

wherein groups $R_1$ to $R_{19}$ are all straight-chain, alkyl groups expressed as $C_nH_{2n+1}$ (n=1~7) and wherein the compounds from the first and second groups are present in an amount of from 10 to 30% by weight, the compound from the third group is present in an amount of from 20 to 35% by weight, the compound from the fourth group is present in an amount of from 15 to 30% by weight, and the compound from the fifth group is present in an amount of more than 10% by weight.

2. The liquid crystal composition of claim 1, wherein the first and second groups are about 20% by weight.

3. The liquid crystal composition of claim 1, wherein the third group is about 25% by weight.

4. The liquid crystal composition of claim 1, wherein the fifth group is about 20% by weight.

* * * * *